(12) United States Patent
Fukai et al.

(10) Patent No.: US 6,321,799 B1
(45) Date of Patent: Nov. 27, 2001

(54) METHOD AND APPARATUS FOR SUPPLYING MERCURY TO ARC TUBE FOR DISCHARGE LAMP

(75) Inventors: Kunio Fukai; Takeshi Fukuyo; Akihiro Nagata; Masakazu Nagasawa, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/599,575

(22) Filed: Jun. 23, 2000

(30) Foreign Application Priority Data

Jun. 25, 1999 (JP) .................................................. 11-179958

(51) Int. Cl.⁷ .................................................. B65B 31/00
(52) U.S. Cl. .................................................. 141/5; 141/67
(58) Field of Search .................................. 141/5, 67, 31, 141/85, 72; 422/100, 101, 102; 445/26, 9

(56) References Cited

U.S. PATENT DOCUMENTS

| | | | |
|---|---|---|---|
| 2,311,930 | * | 2/1943 | Chirelstein . |
| 3,650,304 | * | 3/1972 | Airola et al. ............................ 141/67 |
| 4,340,390 | * | 7/1982 | Collins et al. ........................ 422/100 |
| 4,389,201 | * | 6/1983 | Hansler et al. ......................... 445/26 |
| 4,405,344 | * | 9/1983 | Sisti et al. ................................. 55/67 |
| 4,461,185 | * | 7/1984 | Schoffel ............................ 73/864.01 |
| 4,526,686 | * | 7/1985 | Sisti et al. ......................... 210/198.2 |
| 5,260,030 | * | 11/1993 | Devaughn .............................. 422/100 |
| 5,286,227 | | 2/1994 | Numajiri et al. . |
| 5,477,907 | | 12/1995 | Meyer et al. ......................... 164/133 |
| 5,505,648 | | 4/1996 | Nagasawa et al. . |
| 5,601,465 | | 2/1997 | Fukuyo et al. . |
| 5,707,588 | * | 1/1998 | Tsukishima .......................... 422/100 |
| 5,936,349 | | 8/1999 | Fukai et al. . |

FOREIGN PATENT DOCUMENTS

| | | | |
|---|---|---|---|
| 3614960-A1 | * | 11/1987 | (DE) ..................................... 422/100 |
| 0 048 917 | | 4/1982 | (EP) . |

* cited by examiner

Primary Examiner—Steven O. Douglas
Assistant Examiner—Khou Huynh
(74) Attorney, Agent, or Firm—Sughrue, Mion, Zinn, Macpeak & Seas, PLLC (57) ABSTRACT

A mercury supplying method capable of always supplying a constant amount of mercury into a chamber part easily by executing measurement and ejection of the mercury at the same time. A small diameter pipe as a mercury supply path, is inserted through a glass tube elongating from a chamber part of an arc tube from above so as to have the tip part thereof substantially reaching into the chamber part, and connecting the upstream side of the sealed mercury supply path (mercury barrel) with a gas pressure adjuster. The gas pressure adjuster keeps the inside of the mercury supply path (mercury barrel) at a predetermined pressure so as to maintain the inside of the small diameter pipe in the state filled with mercury as well as applying a predetermined pressure to the mercury in the small diameter pipe for a predetermined time and thus ejecting a predetermined amount of mercury from the small diameter pipe tip part so as to be dropped and supplied to the chamber part. Measurement and ejection of the mercury can be executed at the same time with the small diameter pipe inserted through the glass tube of the arc tube from above. A predetermined amount of mercury can always be supplied into the chamber part in a short time.

21 Claims, 8 Drawing Sheets

METHOD AND APPARATUS FOR SUPPLYING MERCURY TO ARC TUBE FOR DISCHARGE LAMP

BACKGROUND OF THE INVENTION

1. Field of the Invention

The present invention relates to a method and an apparatus for supplying a predetermined amount of mercury to a chamber part of an arc tube during production of the arc tube which is used for a discharge lamp as a light source of a lighting tool such as a head lamp for an automobile, the arc tube having a sealed chamber part with electrodes provided facing each other, a light emitting substance such as mercury and a metal halide sealed therein.

2. Description of the Related Art

Figure 10:
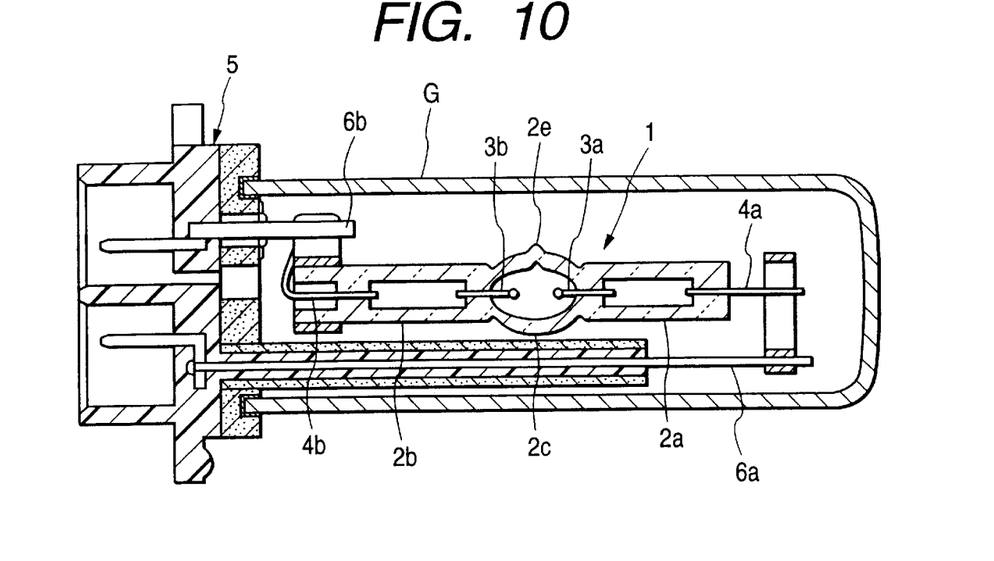
FIG. 10 is a vertical cross-sectional view of a conventional discharge valve for a head lamp.

FIG. 10 is a cross-sectional view of a conventional discharge valve to be used in a head lamp for an automobile comprising an arc tube for a discharge lamp. An arc tube 1 comprises a sealed chamber part 2c including electrode bars 3a, 3b facing each other, a light emitting substance such as mercury and a metal halide sealed therein, formed between a pair of front and rear pinch seal parts 2a, 2b.

An insulating base 5, and a pair of long and short metal lead supports 6a, 6b for supporting the front and rear end part of the arc tube 1, with lead lines 4a, 4b, elongating from the arc tube 1 electrically connected to lead supports 6a, 6b. A globe G surrounds the arc tube 1 and blocks ultraviolet rays that are emitted from the arc tube 1 that can be hazardous to the human body. The mark 2e is the trace of the pinch part remained on the chamber part 2c at the time of pinching the straight tube provided for introducing mercury or a metal halide.

Since the amount of the mercury sealed in the sealed chamber 2c influences the value of the lamp voltage, which is one of the characteristics of the arc tube, it is preferable that a predetermined amount of mercury is supplied into the chamber part 2c in the production process of the arc tube in order to obtain a rated lamp voltage.

Figure 11A:
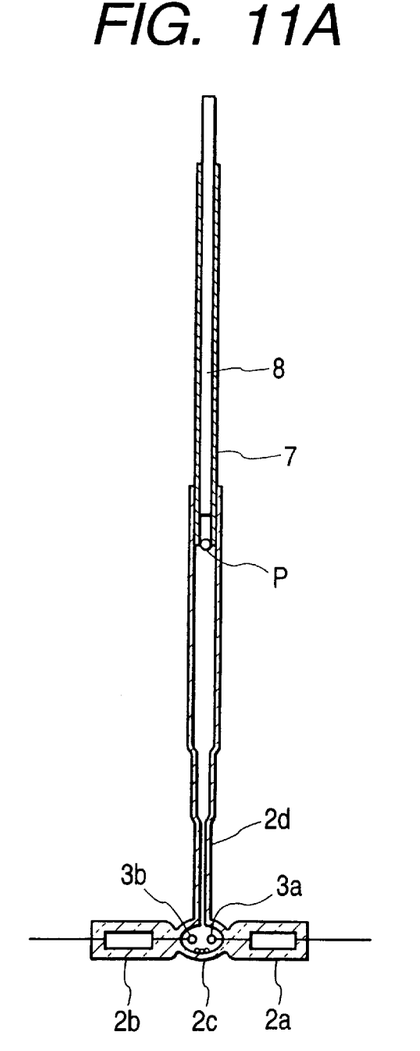
FIG. 11A is a diagram showing the state of inserting a mercury supply pipe through a glass tube in a conventional method for supplying mercury in a chamber part of an arc tube.
Figure 11B:
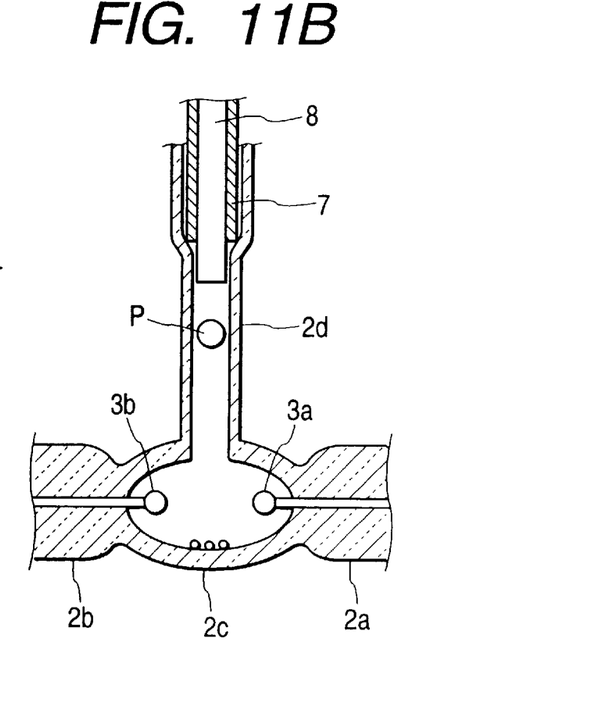
FIG. 11B is a diagram showing the state of poking the mercury droplet.

As shown in FIGS. 11A and 11B, a conventional method for supplying a predetermined amount of mercury to a chamber part of an arc tube comprises the steps of inserting a tube 7 with a mercury droplet P, held at the tip part by adsorption, through a straight tube 2d integrally bonded with a chamber part 2c of an arc tube, to the vicinity of the chamber part 2c, and poking the mercury droplet P with a poking bar 8 fitted in the tube 7 for dropping the same into the chamber part 2c.

Figure 12A:
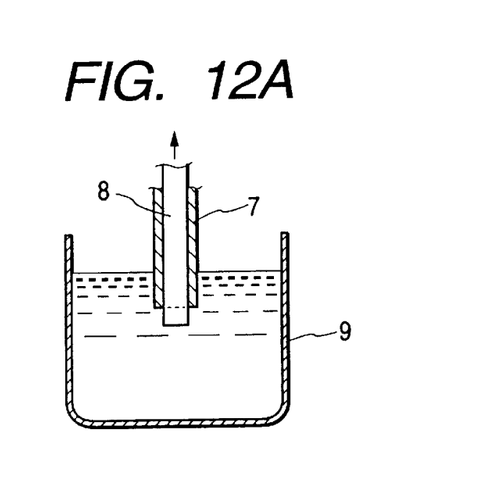
FIG. 12A is a diagram showing the state of taking in the mercury into the pipe tip end part in a conventional method for measuring and holding the mercury by adsorption.
Figure 12B:
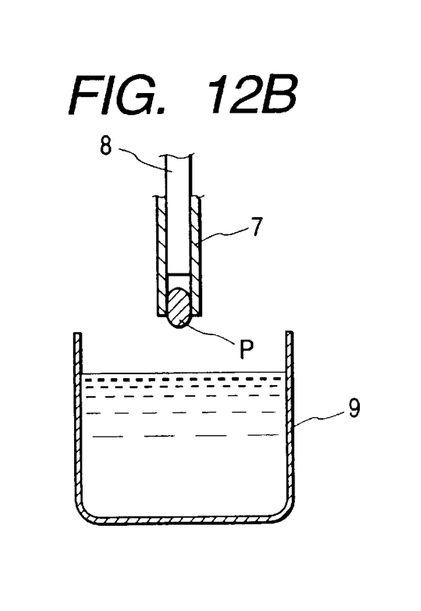
FIG. 12B is a diagram showing the state of the mercury held at the pipe tip end part by adsorption.

For holding the mercury droplet P at the tip part of the tube 7 by adsorption, as shown in FIG. 12A, the tip part of the tube 7 is put in the mercury liquid surface in a container 9 filled with mercury so that a predetermined amount of mercury is introduced into the tube tip part by withdrawing the poking bar 8. Then, by lifting up the tube 7 above the liquid surface, as shown in FIG. 12B, a mercury droplet P can be held by adsorption at the tube tip part, utilizing the surface tension and the vacuum.

However, according to the conventional method and apparatus for supplying mercury, since the operation for holding the mercury by adsorption needs to be executed at a site different from that for ejecting the mercury, a problem is involved in that the operation is troublesome as well as time-consuming.

Furthermore, since it is necessary to put the tip part of the tube 7 into the mercury liquid surface in the container 9, withdraw the poking bar 8 for introducing the mercury into the tube 7 tip part, and lift up the tube 7 and move it above the straight tube 2d, the apparatus structure is complicated.

Moreover, according to the conventional method and apparatus, since the mercury is measured by withdrawing the poking bar 8 with respect to the tube 7 for introducing a predetermined amount of mercury into the tube 7 tip part and it is supplied into the chamber part 2c by poking the mercury droplet P by advancing the poking bar 8 with respect to the tube 7, the mercury cannot be supplied in accurate amounts. That is, the bulging shape of the lower part of the mercury droplet held by adsorption at the tube tip part differs each time, and thus the amount of the mercury droplet held by adsorption is often irregular. Furthermore, in some cases, the mercury may adhere and remain on the tube 7 tip part to the poking bar 8 tip at the time of dropping and supplying the mercury droplet P into the chamber part 2c so that all the mercury droplet held by adsorption may not be supplied into the chamber part 2c.

Furthermore, the volume of the chamber part 2c is as small as about 20 to 50 µl in an arc tube for a discharge valve to be used in a head lamp for an automobile, and the mercury amount to be sealed is slight (1 mg or less). Therefore, the tube 7 and the poking bar 8 need to be processed extremely narrowly. This process is difficult. Furthermore, the technique for smoothly sliding the narrow poking bar 8 in the narrow tube 7 is also demanding.

Accordingly, as a result of the problems of the conventional technique, the present invention supplies a predetermined amount of mercury, corresponding to the high pressure gas application time, by filling the inside of a small diameter pipe with mercury and pressing and ejecting the mercury in the small diameter pipe with a high pressure gas.

SUMMARY OF THE INVENTION

The invention solves many of the problems associated with conventional techniques by providing a method and an apparatus which supplies an accurate amount of mercury to an arc tube for a discharge lamp by ejecting a predetermined amount of mercury in a small diameter pipe by a gas pressure.

The apparatus and method of the present invention supplies mercury to an arc tube for a discharge lamp by inserting a small diameter pipe, which is used as a mercury supply path, through a glass tube opened upward, so that the tip part of the small diameter pipe reaches into the chamber part wherein the upstream side of the mercury supply path is connected to a gas pressure adjuster. The gas pressure adjuster keeps the inside of the mercury supply path at a predetermined pressure, which maintains the inside of the small diameter pipe in the state filled with mercury, and applies a heightened gas pressure on the mercury for ejecting a predetermined amount of mercury from the small diameter pipe tip part.

One form of a glass tube to be used with the above mentioned apparatus and method opens upward, elongating from a chamber part of the arc tube, a glass straight tube elongating from the other end part side of a chamber part of an arc tube with one end part pinch-sealed (see FIGS. 2A to 2D) and a glass straight tube integrally bonded with a chamber part of an arc tube with both end parts pinch-sealed (see FIGS. 11A and 11B) are both included.

Figure 6:
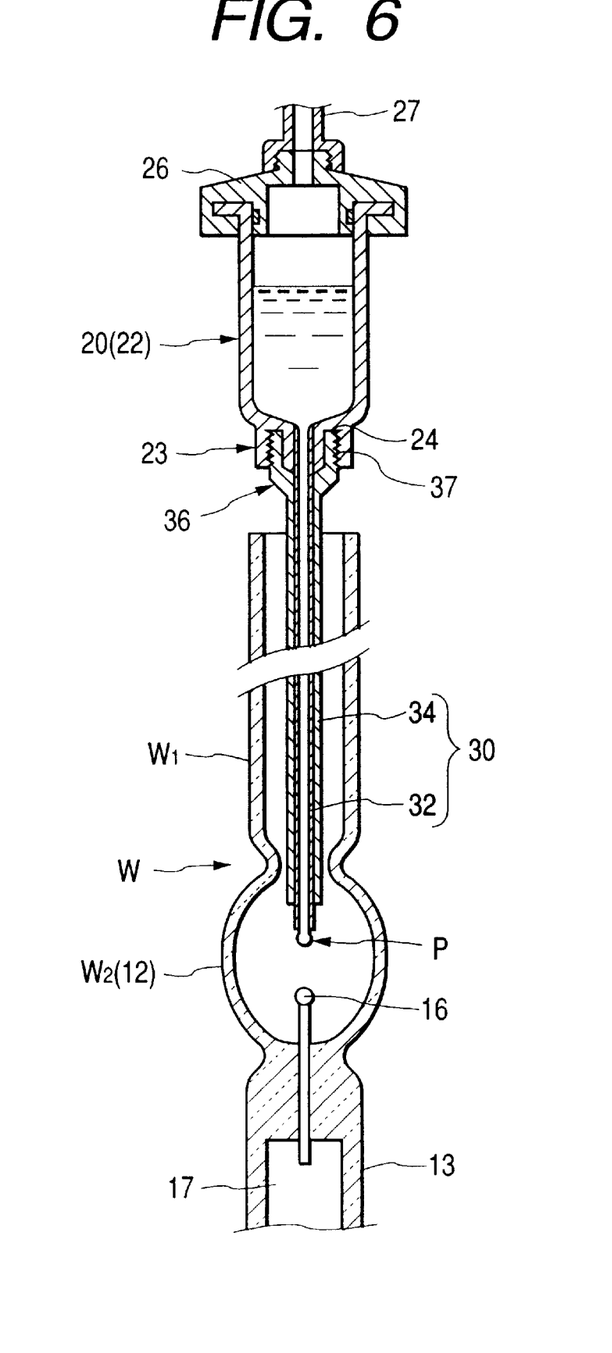
FIG. 6 is an enlarged vertical cross-sectional view of the state with mercury ejected from the small diameter pipe for mercury supply.

One type of mercury supply path can be a configuration wherein a small diameter pipe elongates from a sealed container filled with mercury (see FIG. 6). The inside of the sealed container is set at a predetermined pressure via the gas pressure adjuster with the mercury in the sealed container introduced also into the small diameter pipe so that the surface tension of the mercury, the pressure in the sealed container (pressure applied on the liquid surface of the mercury), and the gravity are in balance, holding the mercury in the small diameter pipe without flowing out. Further, in the case where the pressure applied on the liquid surface of the mercury in the sealed container (mercury in the small diameter pipe) is heightened by introducing a high pressure gas into the sealed container by the gas pressure adjuster, the mercury in the small diameter pipe is pressed and is ejected from the tip end opening part, dropping into the chamber part.

Moreover, since the amount of mercury ejected into the chamber part is determined by the increased pressure in the sealed container (amount of increased pressure applied on the mercury in the small diameter pipe) and the increased pressure application time, a predetermined amount of mercury can be ejected by using the gas pressure adjuster to set the gas pressure to be applied in the sealed container and the amount of time to apply this pressure.

Another aspect of the invention according to the above mentioned method and apparatus is to supply mercury to an arc tube wherein the gas pressure applied on the mercury is heightened by the gas pressure adjuster intermittently so that a predetermined amount of mercury is continually ejected from the small diameter pipe a plurality of times. Since a specific amount of mercury is supplied each time, the total amount of mercury corresponds to the amount of mercury supplied each time, multiplied by the number of times the mercury is ejected.

Another aspect of the invention according to the above method and apparatus is to supply mercury to an arc tube wherein the mercury in the small diameter pipe is vacuum-suctioned, to stop ejecting the mercury from the small diameter pipe tip part. Since the mercury in the small diameter pipe is forced in the opposite direction at the time when the mercury droplet is pushed out of the small diameter pipe tip part, the mercury droplet can be separated smoothly and accurately.

Another aspect of the invention is a method and apparatus for supplying mercury to an arc tube wherein the small diameter pipe is vibrated after completing the mercury ejection into the chamber part. Since the small diameter pipe is vibrated, the residual mercury adhered on the small diameter pipe tip part can be dropped accurately.

Another aspect of the invention is a method and apparatus for supplying mercury to an arc tube wherein the small diameter pipe is made from a metal and is formed with a 0.04 to 0.10 mm, preferably 0.05 to 0.09 mm inner diameter. The small diameter pipe is formed extremely narrowly such that it can be inserted through the narrow glass tube elongating from the extremely small chamber part with about 20 to 50 μl volume. In order to obtain an accurate mercury ejection amount, it is preferable to have a small inner diameter of the small diameter pipe so as to have a small ejection amount per a unit time. However, with a smaller inner diameter, the process of the small diameter pipe is difficult, and further, a high gas pressure needs to be applied for ejecting a predetermined amount of mercury. From these viewpoints, the inner diameter of a small diameter pipe main body is preferably 0.04 mm or more and less than 0.10 mm, and most preferably it is 0.05 to 0.09 mm.

That is, in the present situation, it is difficult to produce a metal small diameter pipe having a less than 0.04 mm inner diameter. Moreover, in the case the inner diameter of a small diameter pipe is 0.04 to 0.10 mm and the initial set pressure in a mercury supply path is a vacuum (500 to 900 hPa), mercury can be ejected smoothly by applying a relatively low high pressure gas of 0.5 to 2.0 kg/cm$^2$. Further, if the inner diameter of a small diameter pipe is 0.10 mm or more, mercury flows out spontaneously, and thus it cannot be used.

In order to ensure the strength of the small diameter pipe or facilitate handling, it is preferable to have a double pipe structure with the small diameter pipe main body integrally inserted in a reinforcing pipe. Moreover, in the case the small diameter pipe is of a double pipe structure, since it is preferable that the reinforcing pipe tip end part does not contact with a mercury droplets for facilitating the separation of the ejected mercury droplet, a form with the small diameter pipe main body tip end part projecting with respect to the reinforcing pipe tip end part is preferable.

Another aspect of the invention is a method and apparatus for supplying mercury to an arc tube wherein a taper is formed on the outer peripheral surface of the small diameter pipe tip part. Since the area of the plane facing downward of the pipe tip end part end face is small, the mercury pushed out from the small diameter pipe tip end part as a droplet can be separated easily from the pointed small diameter pipe tip end part inner peripheral rim, and thus the mercury droplet can be separated sharply.

Another aspect of the invention is a method and apparatus for supplying mercury to an arc tube wherein the small diameter pipe tip part is formed in a V-shape. Since the area of the plane facing downward of the pipe tip end part end face is small, the mercury pushed out from the small diameter pipe tip endpart as a droplet can be separated easily from the pointed V-shaped small diameter pipe tip end part, and thus the mercury droplet can be separated sharply therefor.

Another aspect of the invention is a method and apparatus for supplying mercury to an arc tube wherein the end face of the small diameter pipe tip part is formed in an outwardly projecting R curved surface. Since the small diameter pipe tip part end face is an R curved surface, the area of the plane facing downward of the pipe tip end part is small, and thus the mercury pushed out from the small diameter pipe tip end part as a droplet can be separated easily from the small diameter pipe tip end part so that the mercury droplet can be separated sharply therefor.

DETAILED DESCRIPTION OF THE PREFERRED EMBODIMENTS

Figure 1:
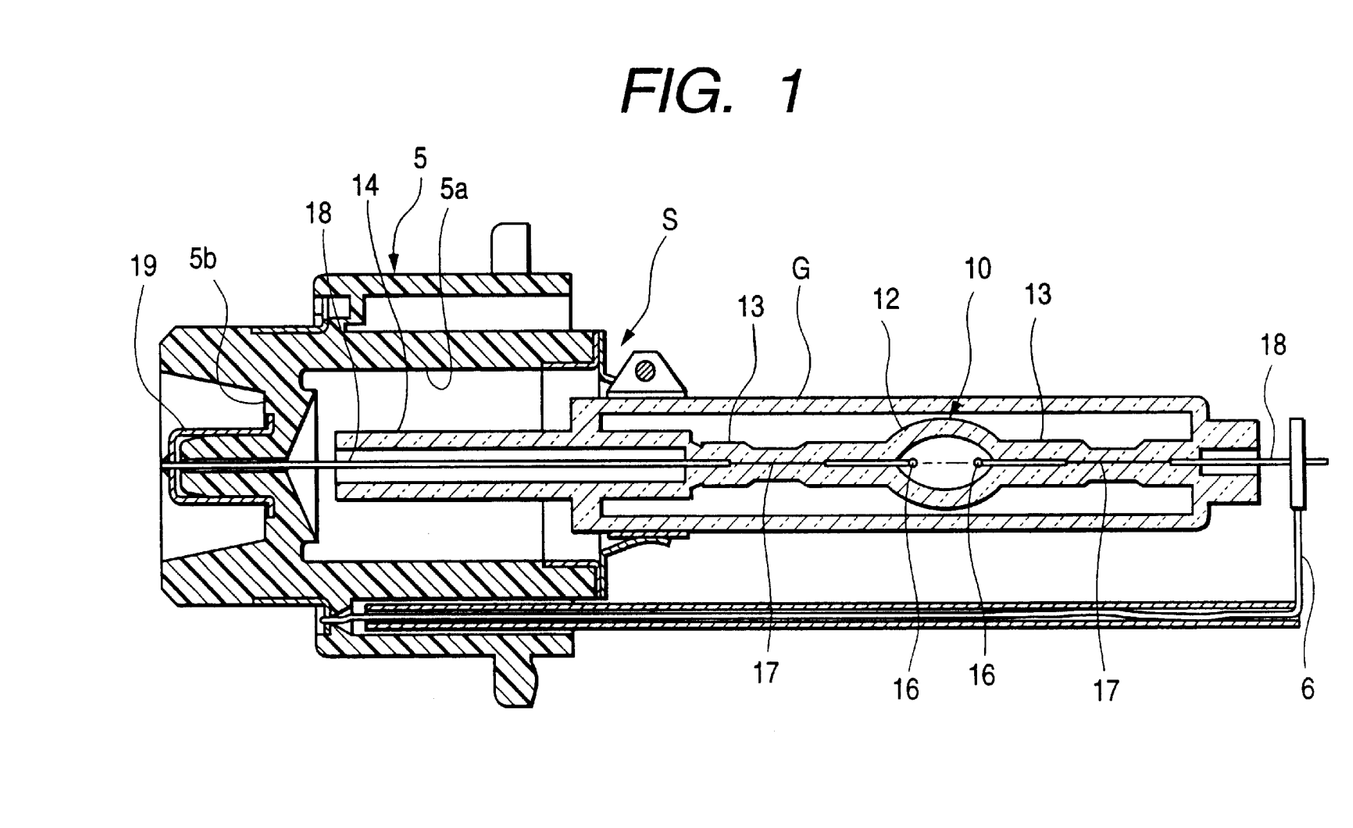
FIG. 1 is a vertical cross-sectional view of a discharge valve of a head lamp for an automobile comprising an arc tube produced according to a method of the invention.

The invention will now be explained with reference to the drawings. FIG. 1 shows a discharge valve for a head lamp, with the arc tube 10 integrally mounted on an insulating base 5, wherein the front end part of the arc tube 10 is supported by a lead support 6 projecting forward with respect to the insulating base 5, the rear end part of the arc tube 10 is supported by a recess part 5a of the base 5, and further, a portion close to the rear end part of the arc tube 10 is gripped by a metal supporting member S fixed to the front surface of the insulating base 5.

The front end side lead line 18 elongating from the pinch seal part 13 of the arc tube 10 is fixed to the lead support 6 by welding. In contrast, the rear end side lead line 18 is inserted through a bottom wall 5b for forming the recess part 5a of the base 5 so as to be fixed to a terminal 19 provided on the bottom wall 5b by welding. A globe G for blocking ultraviolet rays that are emitted from the arc tube 1 that can be hazardous to the human body is integrally welded to the arc tube 10.

An arc tube 10 comprises a round pipe-like quartz glass tube W (FIGS. 2A–2D) with a linear elongating part $w_1$ having a spherical bulging part $w_2$ formed halfway in the longitudinal direction, pinch-sealed at a position close to the spherical bulging part $w_2$ so as to form an elliptic tipless sealed chamber part 12 to serve as a discharging space, with pinch seal parts 13, 13 having a rectangular lateral cross-section formed at both end parts thereof. A starting rare gas, mercury and a light emitting substance, such as a metal halide, is sealed in the sealed chamber part 12. Moreover, tungsten electrode bars 16, 16 comprising discharge electrodes are formed facing each other in the sealed chamber part 12. The electrode bars 16, 16 are connected with molybdenum foils 17, 17 sealed in the pinch seal parts 13, 13. Molybdenum lead lines 18, 18 connected with the molybdenum foils 17, 17 are introduced from the end parts of the pinch seal parts 13, 13 outward, with the rear end side lead line 18 inserted through a round pipe shape part 14 as a non-pinch sealed part, elongating to the outside.

Figures 2A, 2B:
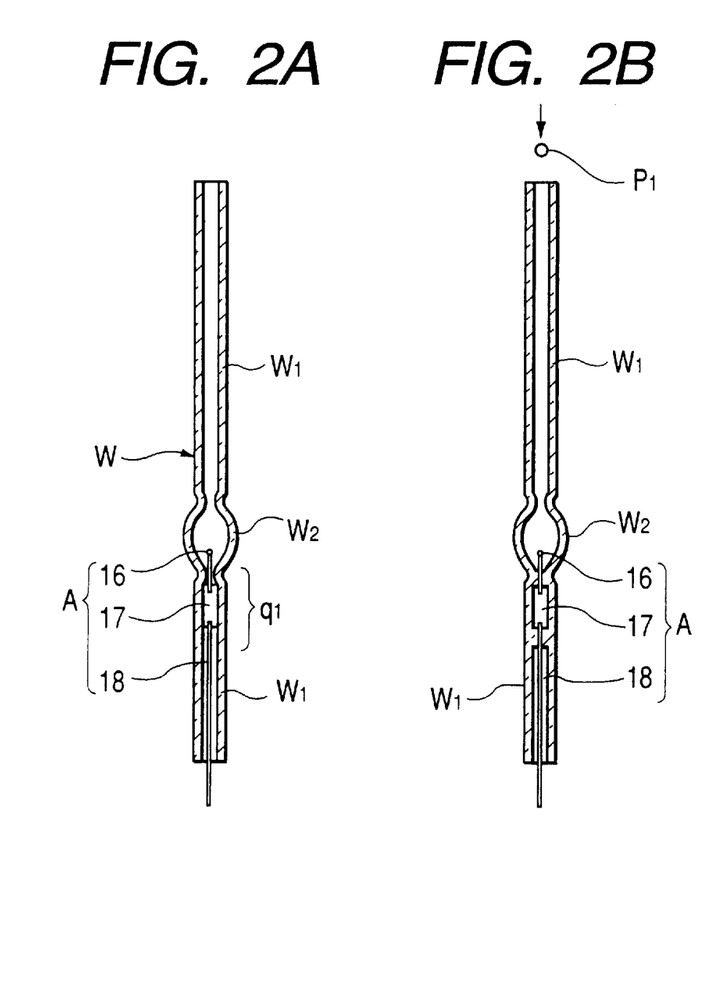
FIG. 2A is an explanatory diagram for a primary pinch seal step.
FIG. 2B is an explanatory diagram for a mercury supplying step.

For the production of the arc tube 10, as shown in FIG. 2A, with an electrode assembly A comprising the electrode bar 16, the molybdenum foil 17 and the lead line 18 connected integrally, inserted into one opening end side of the cylindrical glass tube W having the spherical bulging part $w_2$ formed halfway in the linear elongating part $w_1$, a position $q_1$ in the vicinity of the spherical bulging part $w_2$ is primary pinch-sealed.

Figure 2C:
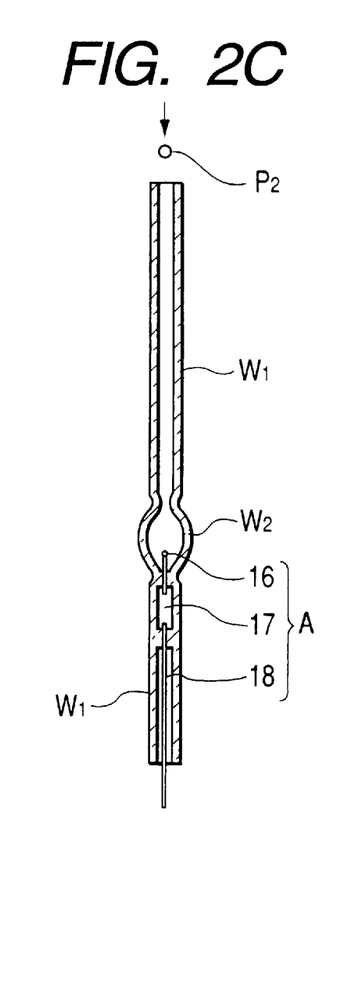
FIG. 2C is an explanatory diagram for a metal halide supplying step.

Then, as shown in FIGS. 2B and 2C, mercury $P_1$, and a light emitting substance such as a metal halide $P_2$ are introduced into the spherical bulging part $w_2$ (chamber part 12 of FIG. 1) from the other opening end side opened upward.

Figure 2D:
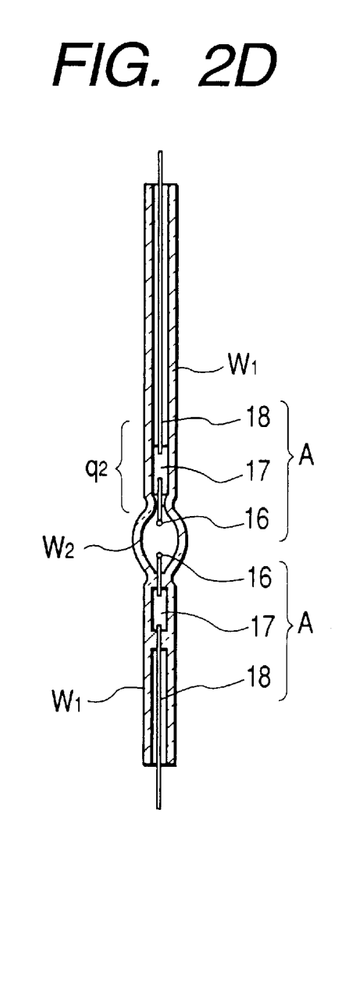
FIG. 2D is an explanatory diagram for a secondary pinch seal step.

As shown in FIG. 2D, after inserting another electrode assembly A comprising the electrode bar 16, the molybdenum foil 17 and the lead line 18 connected integrally into the opening end side, a position $q_2$ in the vicinity of the spherical bulging part $w_2$ is secondarily pinch-sealed so as to seal the spherical bulging part $w_2$ while cooling the spherical bulging part $w_2$ with a liquid nitrogen so as to prevent vaporization of the light emitting substance for completing the arc tube 10 having the tipless sealed chamber part 12.

In the primary pinch seal step shown in FIG. 2A, the pinch seal is executed while introducing an inert gas (in general, an inexpensive argon gas) into the glass tube W as the foaming gas so as not to oxidize the electrode assembly A. Furthermore, in the secondary pinch seal step shown in FIG. 2D, the pinch seal is executed with the opening end closed by pinch seal so as not to vaporize the light emitting substance as well as with the spherical bulging part $w_2$ cooled with a liquid nitrogen in a state close to the vacuum.

The specific method for supplying mercury to the spherical bulging part $w_2$ (chamber part 12) will be explained with reference to FIGS. 3 to 7B.

Figures 3, 4:
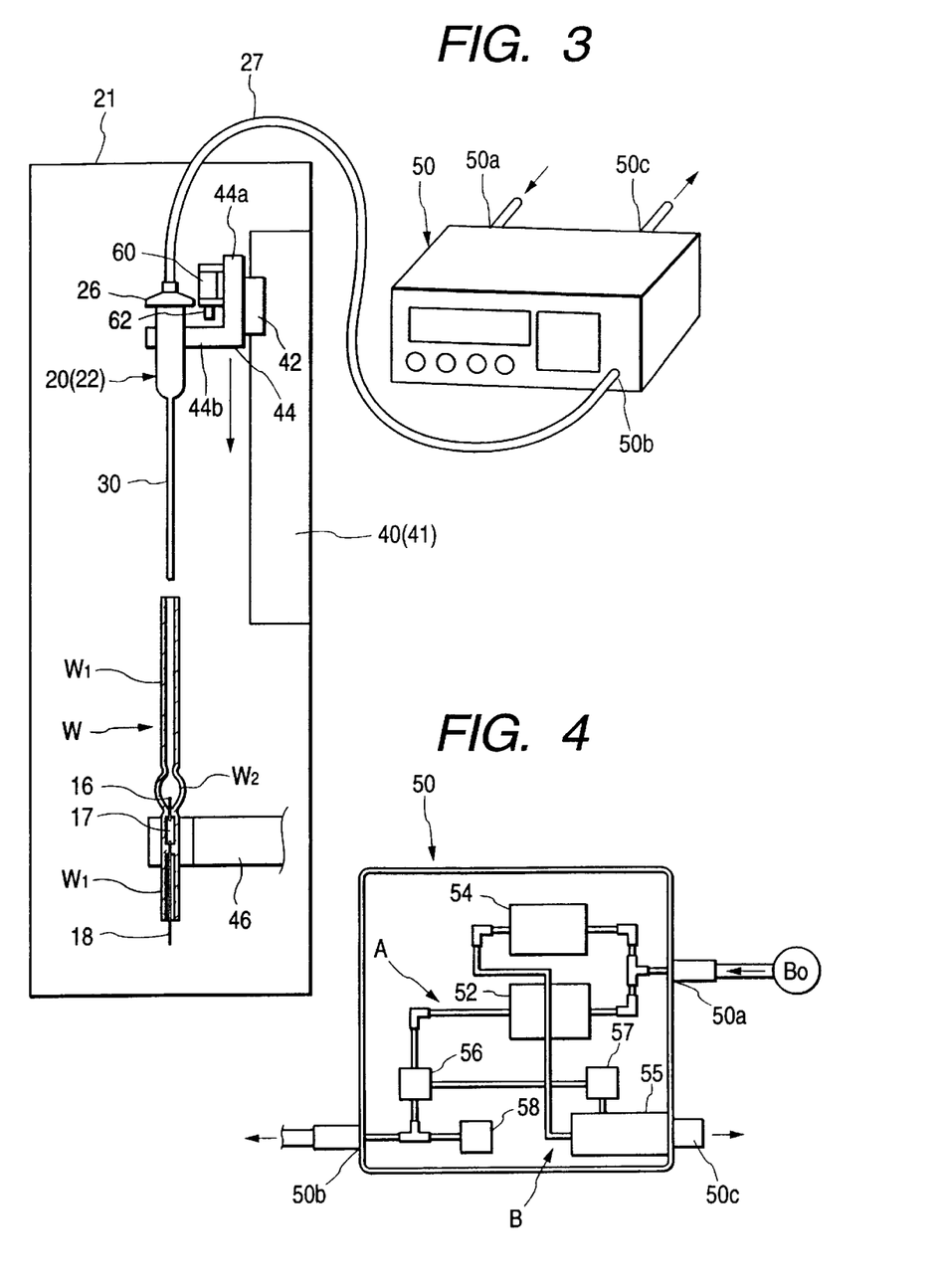
FIG. 3 is a diagram showing the entire configuration of an embodiment of a mercury supplying apparatus of the invention.
FIG. 4 is a diagram showing the entire configuration of a gas pressure adjuster.
Figure 5:
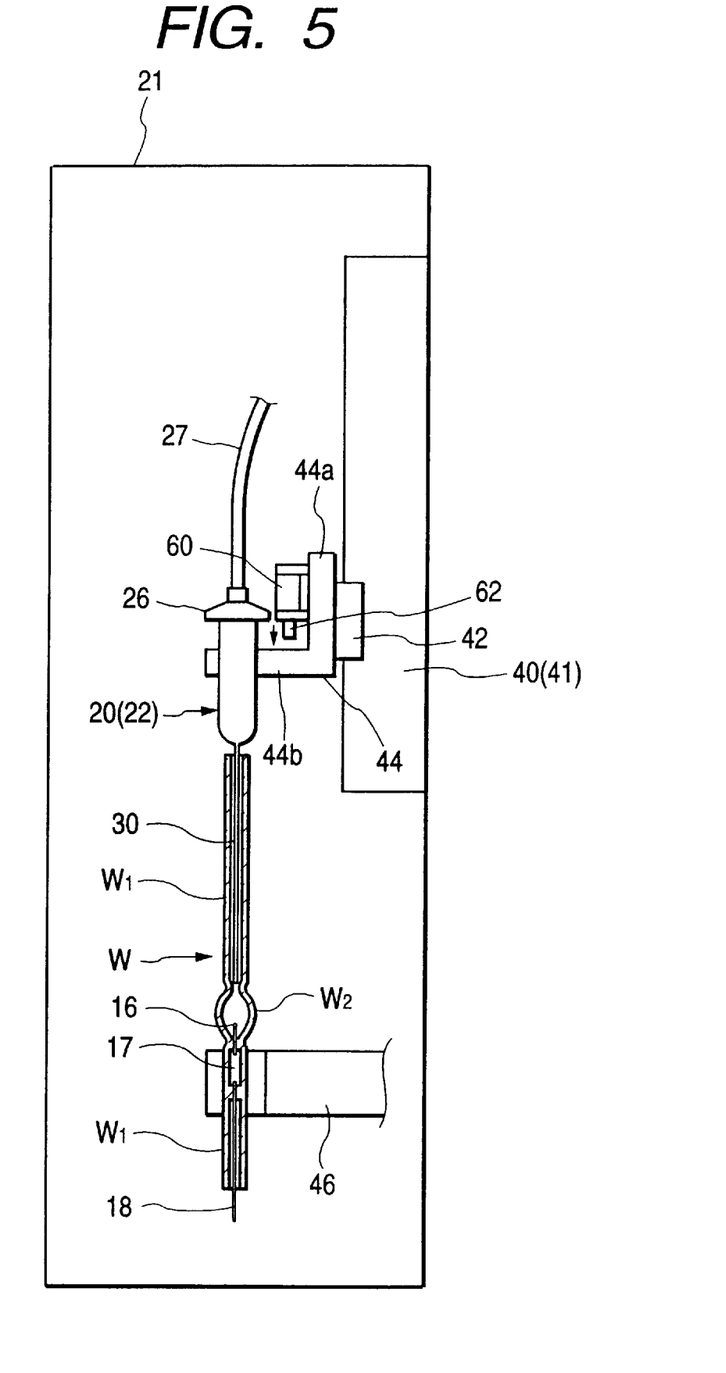
FIG. 5 is a diagram showing the principal part of the mercury supplying apparatus with a small diameter pipe for mercury supply inserted through a glass tube of an arc tube.

As shown in FIGS. 3 and 4, the mercury supplying apparatus comprises mainly a mercury barrel 20 comprising a small diameter pipe 30 elongating downward, an air cylinder 40 fixed with an apparatus main body frame 21 for the vertical ascending or descending operation of the mercury barrel 20, a gas pressure adjuster 50 for adjusting a high pressure gas supplied from a high pressure gas bomb Bo at a predetermined pressure and introducing the same into the mercury barrel 20, a clamper 46 for gripping the arc tube 10 (the round pipe-like quartz glass tube W with one end part pinch-sealed) with the opened linear elongating part $w_1$ upward at a position immediately below the small diameter pipe 30, and an air cylinder 60 for vibrating the small diameter pipe 30.

The mercury barrel 20 comprises a synthetic resin cylindrical barrel main body 22 having a lid 26 mounted thereto for sealing the inside accommodating mercury. The lid 26 is provided with a flexible hose 27 which is attached to the gas pressure adjuster 50. The small diameter pipe 30 elongating downward from the lower end part of the barrel main body 22 is interlocked integrally thereto. A stainless steel small diameter pipe main body 32 (see FIG. 6) having a 0.05 mm inner diameter and a 15 to 22 cm length is inserted in a stainless steel auxiliary pipe 34 and bonded integrally therewith by brazing for ensuring the strength.

A mouthpiece 36 (FIG. 6) is integrally bonded with the upper end part of the small diameter pipe 30 by brazing. A male screw part 37 is formed in the mouthpiece 36. In contrast, a mouthpiece engaging part 23 with a female screw part 24 formed therein is provided in the lower end part of the barrel main body 22 so that by screwing the mouthpiece 36 at the upper end part of the small diameter pipe 30 with the mouthpiece engaging part 23, the small diameter pipe 30 is fixed integrally with the barrel main body 22.

Mercury is stored in the mercury barrel 20 (the barrel main body 22) as well as the inside of the small diameter pipe 30 which is maintained in the state filled with the mercury.

That is, by keeping the pressure in the sealed mercury barrel 20 at a predetermined pressure (700 hPa) by the pressure adjuster 50, the mercury in the small diameter pipe 30 is maintained in the state filled in the small diameter pipe 30 without flowing out owing to the balance among the surface tension, the pressure applied on the mercury and the gravity.

When a high pressure gas is introduced from the pressure adjuster 50 so as to heighten the pressure in the barrel 20 (the pressure applied on the free liquid surface of the mercury), the mercury in the small diameter pipe 30 is pressed downward so that mercury is ejected from the tip end part of the small diameter pipe 30 for the amount corresponding to the pressure application time.

As shown in FIG. 4, the pressure adjuster 50 for guiding the high pressure gas into the barrel 20 via the air hose 27 comprises a high pressure gas generating path A for adjusting the high pressure gas guided from the high pressure gas bomb Bo to an input port 50a at a predetermined pressure by a pressure setter 52 and guiding the same to an output port 50b, a vacuum generating path B for guiding a vacuum (negative pressure) generated by taking in the high pressure gas guided from the high pressure gas bomb Bo to the input port 50a to the output port 50b, and a three direction electromagnetic valve 56 for switching the path between the input port 50a and the output port 50b to the high pressure gas generating path A or the vacuum generating path B at a predetermined time based on a signal from a controlling part (not shown).

An electromagnetic valve 57 provided between the three direction electromagnetic valve 56 and the vacuum generator 55, to be operated interlocking with the three direction electromagnetic valve 56. Numeral 58 is an electromagnetic valve for releasing the gas pressure applied on the output port 50b. Numeral 50c is a vacuum exhaust port of the pressure adjuster 50. The vacuum exhaust from the vacuum generator 55 is exhausted from the exhaust port 50c, and thereby a negative pressure is generated in the path between the three directional electromagnetic valve 56 and the electromagnetic valve 57 of the vacuum generator 55. Moreover, a pressure setter 54 is provided between the input port 50a and the vacuum generator 55. According to the pressure setter 54, the pressure of a high pressure gas to be guided to the vacuum generator 55 is adjusted, and thereby the degree of vacuum (the initial pressure in the mercury barrel 20) generated in the vacuum generating path B can be adjusted.

In the case when the three directional electromagnetic valve 56 is operated from the state wherein the inside of the mercury barrel 20 is a vacuum with the vacuum generating path B selected by the three directional electromagnetic valve 56 so that the high pressure gas generating path A is selected as the path in the pressure adjuster 50, a high pressure gas is guided into the mercury barrel 20 so that the pressure applied on the mercury in the mercury barrel 20 is heightened. Therefore, the mercury in the mercury barrel 20 passes through in the small diameter pipe 30 so as to be ejected from the tip end part of the small diameter pipe 30. In the case the three directional electromagnetic valve 56 is operated from this state (the state wherein the mercury is ejected with the high pressure gas generating path A selected) so that the vacuum generating path B is selected again by the pressure adjuster 50, the inside of the mercury barrel 20 communicating with the vacuum generating path B returns into the vacuum state so that the mercury in the small diameter pipe 30 is vacuum-suctioned. Therefore, the mercury ejected from the small diameter pipe 30 can instantly be separated from the mercury in the small diameter pipe 30 as a mercury droplet owing to the inertial force as well as the ejection of the mercury is ceased.

Since the pressure set by the pressure setter 52 is 1.0 kg/cm$^2$ and the degree of vacuum set by the vacuum generator 55 is 700 hpa, the initial pressure in the mercury barrel 20 (the pressure with a vacuum by the vacuum generating path B functioning on the mercury barrel 20) is 700 hPa. The timing of switching the three directional electromagnetic valve 56 by the controlling part (not illustrated) (time switched from the vacuum generating path B to the high pressure gas generating path A) is set at 0.1 seconds.

That is, in the 0.1 second duration wherein the pressure in the mercury barrel 20 changes from the initial vacuum (700 hPa) to the high pressure (1.0 kg/cm$^2$), the mercury is ejected so that a predetermined small amount, that is, 1 mg or less of mercury, is supplied into the chamber part 12. Furthermore, since the mercury in the small diameter pipe 30 is vacuum-suctioned immediately after the return of the pressure in the barrel 20 from the high pressure (1 kg/cm$^2$) to the vacuum (700 hPa), that is, simultaneously with switch of path in the pressure adjuster 50 to the negative pressure generating path B, the mercury ejected from the small diameter pipe 30 can be separated extremely sharply.

The tip end part of the small diameter pipe main body 32 is projecting by a predetermined length with respect to the tip end of the auxiliary pipe 34 so that mercury can hardly remain on the opening end part of the pipe main body 30 as the mercury ejecting part.

Figure 7A:
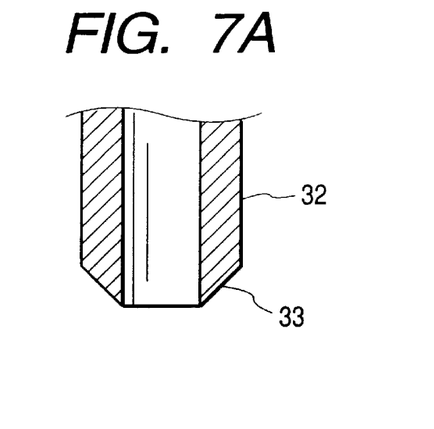
FIG. 7A is an enlarged vertical cross-sectional view of the small diameter pipe tip end part.
Figure 7B:
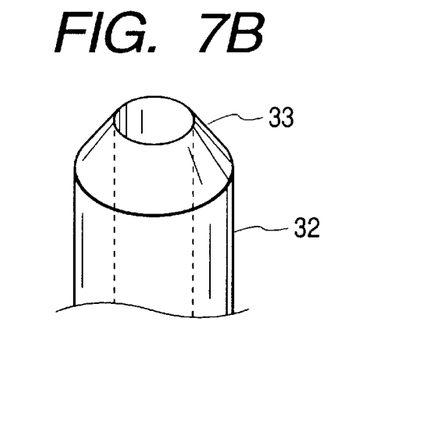
FIG. 7B is an enlarged perspective view of the small diameter pipe tip end part.

Furthermore, as shown in FIGS. 7A and 7B, a taper 33 is provided on the outer peripheral surface so that a mercury droplet can be separated smoothly from the tip end part of the pipe main body 32. That is, mercury ejected from the tip end part of the pipe main body 32 forms a droplet so as to be cut off by its own weight. Since the contacting surface of the mercury droplet and the pipe tip end part is only the pointed peripheral rim, the mercury droplet can be separated easily by its own weight. That is, the ejected mercury can be separated sharply.

The air cylinder 40 comprises a cylinder main body 41 provided vertically in the apparatus main body 21, and a slider 42 assembled to the cylinder main body 41 which is vertically slidably. The mercury barrel 20 (barrel main body 22) is interlocked integrally with the slider 42 via a bracket 44 so that the mercury barrel 20 (small diameter pipe 30) can ascend or descend integrally with the slider 42 according to the operation of the air cylinder 40.

The bracket 44 for interlocking the mercury barrel 20 with the slider 42 of the air cylinder 40 is formed in an L shape. An air cylinder 60 for swaying the small diameter pipe 30 is provided in an L-shaped vertical bar-like part 44a of the bracket 44 at the slider 42 side. The air cylinder 60 is operated after finishing the mercury supply from the small diameter pipe 30 to the chamber part 12 of the arc tube by a predetermined amount so that a cylinder rod 62 strikes the L-shaped lateral bar-like part 44b of the bracket 44. The vibration is transmitted to the small diameter pipe 30 via the mercury barrel 20 so as to drop the residual mercury adhered on the small diameter pipe 30 tip end part.

The step of supplying a predetermined amount of mercury to the chamber part 12 of the arc tube 10 with the apparatus will be explained.

The apparatus is set in the state capable of ejecting mercury from the small diameter pipe 30 by switching the three direction electromagnetic valve 56 many times so as to repeatedly apply a high pressure (1.0 kg/cm$^2$) in the mercury barrel 20 in the vacuum (700 hPa) state. That is, preparation for supplying the mercury from the small diameter pipe 30 is completed by filling the inside of the small diameter pipe 30 entirely with the mercury in the sealed barrel 20 with a negative pressure (700 hPa) applied in the sealed barrel 20. The arc tube 10 is gripped by the clamper 46 so as to be set at a predetermined position immediately below the small diameter pipe 30. According to the operation of the air cylinder 40, the mercury barrel 20 (small diameter pipe 30) descends. The small diameter pipe 30 is inserted through the glass tube (linear elongating part W) with the tip end part thereof disposed at the substantially central position of the chamber part.

The three direction electromagnetic valve 56 is switched at a predetermined time so as to apply the high pressure gas in the mercury barrel 20 for 0.1 seconds which supplies a predetermined amount of mercury into the spherical bulging part $w_2$ (chamber part 12) of the arc tube 10. The air cylinder 60 is operated for vibrating the small diameter pipe 30 so as to drop the residual mercury in the case it is adhered on the tip end part of the small diameter pipe 30. Finally, the air cylinder 40 is operated so that the mercury barrel 20 (small diameter pipe 30) ascends for taking out the small diameter pipe 30 from the glass tube (linear elongating part $w_1$).

The damper 46 moves the arc tube 10 (quartz glass tube W) with the predetermined amount of the mercury supplied into the apparatus main body in the next metal halide supplying step as well as grips a new arc tube (round pipe-like quartz glass tube W with one end part pinch-sealed) for setting the same in the predetermined position in the apparatus main body 21 again. Accordingly, the predetermined amount of mercury is supplied to the spherical bulging part $w^2$ Of the glass tube W (the chamber part 12 of the arc tube 10) successively.

Figure 8A:
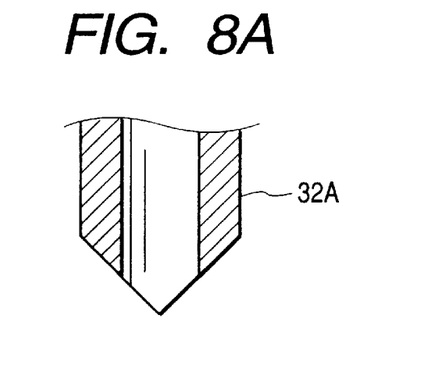
FIG. 8A is an enlarged vertical cross-sectional view of the small diameter pipe tip end part for mercury supply as the principal part of a mercury supplying apparatus in one embodiment of the invention.
Figure 8B:
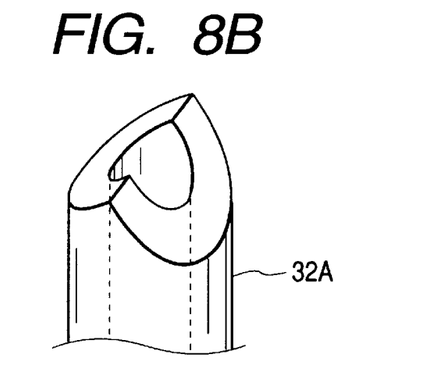
FIG. 8B is an enlarged perspective view of the small diameter pipe tip end part.

FIGS. 8A and 8B show the small diameter pipe tip end part as the principal part of another embodiment of the invention.

Since the tip end part of the small diameter pipe main body 32A is cut in a V shape, the small diameter pipe main body 32A is pointed which pushes mercury out from the pipe main body 32A as a droplet that can be easily separated, and thus the ejected mercury can be separated sharply.

Although the timing of switching the three directional electromagnetic valve 56 (time switched from the vacuum generating path B to the high pressure gas generating path A) is set at 0.1 seconds so as to apply a 1 kg/cm$^2$ pressure on (mercury in) the mercury barrel 20 for the duration in the above-mentioned embodiment, the timing of switching the three direction electromagnetic valve 56 (high pressure gas application time) can be set freely between 0.02 to 0.5 second.

The vacuum generated by the pressure adjuster 50 (vacuum generator 55) is not limited to 700 hPa, but it can be set freely in the range from 500 to 900 hPa.

Therefore, for example, by a shorter switching timing of the three directional electromagnetic valve 56 (high pressure gas application time) or a lower pressure of the applied high pressure gas, a predetermined amount of mercury necessary per arc tube can be supplied by switching the three directional electromagnetic valve 56 several times for several mercury ejections. In this case, when the predetermined amount of the mercury supply to the arc tube is finished by the continual mercury ejection from the small diameter pipe 30 for the several times, the small diameter pipe 30 is vibrated by the air cylinder 60. Moreover, the mercury amount ejected from the small diameter pipe 30 for one time can be set freely by changing the switching timing of the three directional electromagnetic valve 56 and the pressure of the high pressure gas.

Figure 9A:
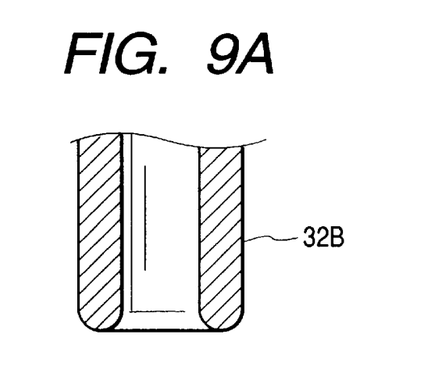
FIG. 9A is an enlarged vertical cross-sectional view of the small diameter pipe tip end part for mercury supply as the principal part of a mercury supplying apparatus in another embodiment of the invention.
Figure 9B:
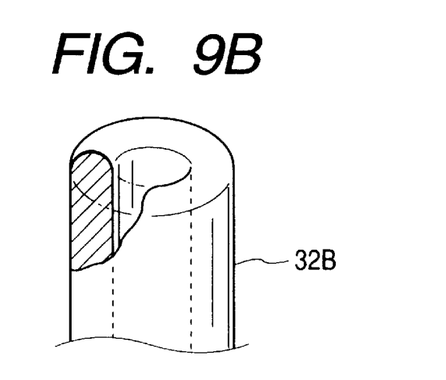
FIG. 9B is an enlarged perspective view of the small diameter pipe tip end part.

FIGS. 9A and 9B show the small diameter pipe tip end part as the principal part of another embodiment of the invention. Since the tip end part of the small diameter pipe main body 32B is formed in a curved surface with a vertical R-shaped cross-section, the contact area with respect to the mercury is small at the pipe tip end part, and thus the mercury pushed out from the pipe main body 32B as a droplet can be separated easily so that the mercury droplet can be separated sharply.

Although the mercury is ejected by applying a 1.0 kg/cm$^2$ high pressure gas with the initial pressure in the mercury barrel 20 set at 1 atmospheric pressure in the above-mentioned embodiment, the initial pressure in the mercury barrel 20 and the pressure of the high pressure gas to be applied are not limited to the above-mentioned values.

Although the mercury barrel 20 (small diameter pipe 30) ascends or descends with respect to the arc tube 10 held in the fixed state in the above-mentioned embodiment, the arc tube 10 may ascend or descend with respect to the mercury barrel 20 (small diameter pipe 30) held in the fixed state instead for inserting the small diameter pipe 30 through the glass tube in the arc tube.

Moreover, although the method for supplying mercury to an arc tube in the production process of a tipless arc tube comprising the steps of the primary pinch seal of one end side of the arc tube, supplying the mercury P, and the metal halide $P_2$ from the opening side of the glass tube (linear elongating part) on the other end, and the secondary pinch seal of the glass tube has been explained in the above-mentioned embodiment, the invention can also be adopted in the case of supplying mercury to an arc tube in the production process of an arc tube with a tip comprising the steps of providing a straight tube (exhausting tube) of a glass tube communicating with a chamber part pinch-sealed at both end parts, supplying mercury and a metal halide via the straight tube, and pinching the straight tube as shown in FIGS. 11A and 11B.

As is apparent from the above-mentioned description, according to the method and apparatus for supplying mercury to an arc tube for a discharge lamp of the invention, since measurement and ejection of the mercury can be executed at the same time with the small diameter pipe inserted through the glass tube of the arc tube from above, excellent operativity can be enabled. Since a predetermined amount of mercury can always be supplied into the chamber part in a short time, it is extremely effective for the mass production of the arc tube. Furthermore, since the produced arc tube having the mercury supplied by the above method has a constant mercury amount, a constant lamp voltage can be maintained and thus, guarantee the quality of the arc tube.

In particular, according to the method and apparatus of the present invention, since the mercury in the small diameter pipe is measured and ejected by the gas pressure, the mercury measuring and ejecting means can be extremely simple. Furthermore, since measurement and ejection of the mercury can be executed with the small diameter pipe inserted through the glass tube of the arc tube, the structure of the mercury supplying apparatus can be extremely simple.

Another aspect of the invention according to the above method and apparatus is since the mercury amount to be supplied to the arc tube can be administered highly accurately in the range of the amount corresponding to multiples of the ejection amount from the small diameter pipe per one time, the apparatus can also be utilized for the mercury supply to the arc tubes comprising chambers with different volumes.

According to another aspect of the invention according to the above method and apparatus, by vacuum-suctioning of the mercury in the small diameter pipe at the time of ejecting the mercury, the ejected mercury droplet can be separated sharply so that the mercury can be supplied smoothly by a predetermined amount.

According to another aspect of the invention according to the above method and apparatus, even in the case where residual mercury is adhered on the small diameter pipe tip end part, since the residual mercury can be dropped by the vibration of the small diameter pipe, the adhered mercury cannot remain on the small diameter pipe tip end part, and thus the supplied mercury amount can be constant and the lamp voltage of the mass-produced arc tubes can be guaranteed at a constant value.

According to another aspect of the invention according to the above method and apparatus, since the initial pressure applied on the mercury can be set at 1 atmospheric pressure so that the predetermined amount of the mercury can be ejected smoothly by a relatively low high pressure gas, it is effective for the mass production of the arc tube.

According to another aspect of the invention according to the above method and apparatus, since the mercury ejected from the small diameter pipe can be separated sharply, an accurate amount of mercury can be supplied smoothly.

While only certain embodiments of the invention have been specifically described herein, it will be apparent that numerous modifications may be made thereto without departing from the spirit and scope of the invention.

The present invention is based on Japanese Patent Application No. Hei. 11-179958 which is incorporated herein by reference.

What is claimed is:

1. A method for supplying mercury to an arc tube for a discharge lamp comprising the steps of:
   inserting a small diameter pipe through a glass tube opened upward, so as to have a tip part of said small diameter pipe reach into a chamber of an arc tube;
   injecting mercury into said small diameter pipe;
   connecting an upstream side of said small diameter pipe to a gas pressure adjuster for keeping the inside of said small diameter pipe at a predetermined pressure, said predetermined pressure being used to maintain the inside of the small diameter pipe in a state at least partially filled with said mercury; and
   increasing the gas pressure on said mercury in said small diameter pipe by the gas pressure adjuster for a predetermined amount of time for ejecting a predetermined amount of mercury from said small diameter pipe tip part, and applying a negative pressure on the mercury immediately after the predetermined amount of mercury is ejected.

2. A method for supplying mercury to an arc tube for a discharge lamp according to claim 1, further comprising the step of:
   intermittently adjusting the amount of gas pressure applied to said mercury using the gas pressure adjuster so that said mercury is ejected from the small diameter pipe a plurality of times.

3. The method for supplying mercury to an arc tube for a discharge lamp according to claim 1, further comprising the step of:
   applying negative pressure on said mercury as an initial pressure so that the mercury in the small diameter pipe is vacuum-suctioned, thereby stopping the ejection of said mercury from the small diameter pipe tip part.

4. The method for supplying mercury to an arc tube for a discharge lamp according to claim 1, further comprising the step of:
   vibrating the small diameter pipe to complete mercury ejection into said chamber.

5. The method for supplying mercury to an arc tube for a discharge lamp according the claim 1, further comprising the step of increasing the predetermined pressure for approximately 1 second.

6. The method for supplying mercury to an arc tube for a discharge lamp according the claim 1, further comprising the step of increasing the pressure by 1 kg/cm$^2$.

7. A method for supplying mercury to an arc tube for a discharge lamp according to claim 1, further comprising the step of:
   positioning the arc tube vertically, wherein the chamber is a light emitting portion of the arc tube, and the pipe is inserted into the vertically positioned arc tube from an upper opening end of the arc tube to reach the light emitting portion.

8. An apparatus for supplying mercury to an arc tube for a discharge lamp comprising:
   a small diameter pipe having a proximal end and a distal end adapted to be received in a light emitting chamber of the arc rube; and
   a gas pressure adjuster connected to the proximal end of said small diameter pipe, said gas pressure adjuster keeping an inside of said small diameter pipe at a predetermined pressure, said predetermined pressure being used to maintain the inside of said small diameter pipe in a state filled with a predetermined amount of mercury and subsequently increasing said predetermined pressure for a predetermined amount of time for ejecting a specific amount of mercury from the distal end of said small diameter pipe, and applying negative pressure on the mercury immediately after the specific amount of mercury is ejected.

9. The apparatus for supplying mercury to an arc tube for a discharge lamp according to claim 8, wherein said small diameter pipe is a metal pipe having a 0.04 to 0.10 mm inner diameter.

10. The apparatus for supplying mercury to an arc tube for a discharge lamp according to claim 8, wherein a taper is formed on an outer peripheral surface of the distal end of said small diameter pipe.

11. The apparatus for supplying mercury to an arc tube for a discharge lamp according to claim 8, wherein the distal end of said small diameter pipe has a V-shape.

12. The apparatus for supplying mercury to an arc tube for a discharge lamp according to claim 8, wherein the distal end of said small diameter pipe has an outwardly projecting curved surface.

13. The apparatus for supplying mercury to an arc tube for a discharge lamp according to claim 8, wherein said small diameter pipe is a metal pipe having a 0.05 to 0.09 mm inner diameter.

14. The apparatus for supplying mercury to an arc tube for a discharge lamp according to claim 8, further comprising a glass tube for receiving the specific amount of mercury.

15. The apparatus for supplying mercury to an arc tube for a discharge lamp according to claim 8, further comprising a vibrator which vibrates said small diameter pipe.

16. An apparatus for supplying mercury to an arc tube for a discharge lamp according to claim 8 further comprising a container containing a predetermined amount of mercury, said container communicating with said small diameter pipe.

17. The apparatus recited in claim 16, wherein said container has a larger diameter than the diameter of said small diameter pipe.

18. The apparatus recited in claim 17, wherein said container is positioned at the proximal end of said small diameter pipe.

19. A system including the apparatus recited in claim 8, comprising an arc tube, wherein said arc tube is positioned vertically, said arc tube comprises a chamber, said chamber is a light emitting portion of said arc tube, and wherein an upper opening of said arc tube is adapted to receive said small diameter pipe, the distal end of said small diameter pipe being received in said light emitting portion.

20. A method for supplying mercury to an arc tube for a discharge lamp comprising steps of:

pinch sealing one end of the arc tube, and leaving an opposite end of the arc tube open to the atmosphere;

inserting a small diameter pipe through an upwardly open end of the arc tube, so as to have a tip part of the small diameter pipe reach into a light emitting chamber of the arc tube;

injecting mercury into the small diameter pipe;

connecting an upstream side of the small diameter pipe to a gas pressure adjuster for keeping the inside of the small diameter pipe at a predetermined pressure, the predetermined pressure being used to maintain the inside of the small diameter pipe in a state at least partially filled with the mercury;

increasing the gas pressure on the mercury in the small diameter pipe by the gas pressure adjuster for a predetermined amount of time for ejecting a predetermined amount of the mercury from the small diameter pipe tip part; and pinch sealing the open end of the arc tube to seal the chamber of the arc tube with the mercury inside.

21. A system for supplying mercury to an arc tube for a discharge lamp comprising:

an arc tube having an upwardly open end and a light emitting chamber;

a small diameter pipe having a proximal end and a distal end, the distal end being sized to be received in said light emitting chamber by insertion of said pipe into the open end of said arc tube; and a gas pressure adjuster connected to the proximal end of said small diameter pipe, said gas pressure adjuster keeping an inside of said small diameter pipe at a predetermined pressure, said predetermined pressure being used to maintain the inside of said small diameter pipe in a state filled with a predetermined amount of mercury and subsequently increasing said pressure for a predetermined amount of time for ejecting a specific amount of mercury from the distal end of said small diameter pipe into said light emitting chamber, and applying negative pressure on the mercury immediately after the specific amount of mercury is ejected.

* * * * *